US006905728B1

United States Patent
Hu et al.

(10) Patent No.: US 6,905,728 B1
(45) Date of Patent: Jun. 14, 2005

(54) COLD GAS-DYNAMIC SPRAY REPAIR ON GAS TURBINE ENGINE COMPONENTS

(75) Inventors: Yiping Hu, Greer, SC (US); Murali Madhava, Gilbert, AZ (US); Federico Renteria, Greenville, SC (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/806,727

(22) Filed: Mar. 22, 2004

(51) Int. Cl.[7] .............................................. B05C 13/00
(52) U.S. Cl. ...................... 427/142; 427/379; 427/191; 427/380; 427/140
(58) Field of Search .................. 427/140, 141, 427/142, 331, 350, 379, 380, 383.1, 421, 327.2, 427, 180, 189–191, 355, 372.2, 374.1, 374.6, 383.7, 422

(56) References Cited

U.S. PATENT DOCUMENTS

| | | | |
|---|---|---|---|
| 4,008,844 A | 2/1977 | Duvall et al. | |
| 4,050,133 A | 9/1977 | Cretella et al. | |
| 5,156,321 A | 10/1992 | Liburdi et al. | |
| 5,302,414 A | 4/1994 | Alkhimov et al. | |
| 5,448,828 A | 9/1995 | Willems et al. | |
| 5,732,467 A | 3/1998 | White et al. | |
| 6,049,978 A | 4/2000 | Arnold | |
| 6,139,913 A | 10/2000 | Van Steenkiste et al. | |
| 6,283,386 B1 | 9/2001 | Van Steenkiste et al. | |
| 6,365,222 B1 * | 4/2002 | Wagner et al. | 427/140 |
| 6,384,365 B1 | 5/2002 | Seth et al. | |
| 6,444,259 B1 * | 9/2002 | Subramanian et al. | 427/191 |
| 6,491,208 B2 | 12/2002 | James et al. | |
| 6,520,401 B1 | 2/2003 | Miglietti | |
| 6,623,796 B1 | 9/2003 | Van Steenkiste | |
| 6,626,228 B1 | 9/2003 | Bewlay et al. | |
| 6,706,319 B2 * | 3/2004 | Seth et al. | 427/190 |
| 2001/0045363 A1 | 11/2001 | Strangman et al. | |
| 2002/0197507 A1 | 12/2002 | Narasimhan et al. | |
| 2003/0088980 A1 | 5/2003 | Arnold | |
| 2003/0147742 A1 | 8/2003 | Thomas | |
| 2003/0207031 A1 | 11/2003 | Strangman et al. | |

OTHER PUBLICATIONS

M. Grujicic, J.R. Saylor, D.E. Beasley, W.S. DeRosset, D. Helfritch, "Computational analysis of the interfacial bonding between feed–powder particles and the substrate in the cold–gas dynamic–spray process", Applied Surface Science, Apr. 27, 2003, pp. 211–227, Elsevier Science B.V., U.S.

* cited by examiner

Primary Examiner—Shrive P. Beck
Assistant Examiner—David Turocy
(74) Attorney, Agent, or Firm—Ingrassia Fisher & Lorenz

(57) ABSTRACT

A new method for repairing turbine engine components is provided. The method utilizes a cold gas-dynamic spray technique to repair degradation on turbine blades, vanes and other components. In the cold gas-dynamic spray process particles at a temperature below their fusing temperature are accelerated and directed to a target surface on the turbine blade. When the particles strike the target surface, the kinetic energy of the particles is converted into plastic deformation of the particle, causing the particle to form a strong bond with the target surface. Post-spray processing is then performed to consolidate and homogenize the applied materials and restore integrity to the material properties in the repaired turbine component. Thus, the cold gas-dynamic spray process and post-spray processing can be employed to effectively repair degraded areas on gas turbine components.

11 Claims, 4 Drawing Sheets

COLD GAS-DYNAMIC SPRAY REPAIR ON GAS TURBINE ENGINE COMPONENTS

FIELD OF THE INVENTION

This invention generally relates to turbine engines, and more specifically relates to the repair of turbine engine components such as blades and vanes.

BACKGROUND OF THE INVENTION

Turbine engines are used as the primary power source for aircraft, in the forms of jet engines and turboprop engines, as auxiliary power sources for driving air compressors, hydraulic pumps, etc, on aircraft, industrial gas turbine (IGT) power generation and as stationary power supplies such as backup electrical generators for hospitals and the like. The same basic power generation principles apply for all these types of turbine engines. Compressed air is mixed with fuel and burned, and the expanding hot combustion gases are directed against stationary turbine vanes in the engine. The vanes turn the high velocity gas flow partially sideways to impinge on the turbine blades mounted on a turbine disk or wheel that is free to rotate.

The force of the impinging gas causes the turbine disk to spin at high speed. Jet propulsion engines use this power to draw more air into the engine and the high velocity combustion gas is passed out of the aft end of the gas turbine, creating forward thrust. Other engines use this power to turn a propeller, electrical generator, or other devices.

High pressure turbine (HPT) components, including turbine blades are critical components in any turbine engine. During operation of the turbine engine, the HPT components are subjected to high heat (often in excess of 2000 degrees F.) and stress loadings as they experience operational conditions and are impacted by the hot gas. This high heat and stress can result in unacceptably high rates of degradation on the turbine components due to erosion, oxidation, corrosion, thermal fatigue cracks and foreign object damage. Such conditions result in many cases in the need for repair and/or replacement, something that can result in significant operating expense and time out of service.

Traditional methods of repair have had limited success. One primary reason for the lack of success is that the materials used to make HPT components do not lend themselves to conventional repair techniques. For example, many materials currently used in turbine blades and vanes suffer from poor weldability. Repairing the turbine blade with conventional welding techniques subjects the turbine blade to high temperatures. However, at such high temperatures the welding areas are likely to suffer severe oxidation. Also, repairing the HPT components with conventional welding techniques at room temperature is prone to form hot cracking in the welding area. This can require extensive reworking thus adding significantly to the cost of the repair. Furthermore, in some cases the cracking can cause the repair to be ineffective or otherwise render the turbine blade unusable for further engine service.

As one specific example, in the repair of turbine blade tips current extension repair techniques have included the application of intermediate cladding of materials which exhibit good weldability to the turbine blade prior to welding the final tip extension. Unfortunately, this method also has limitations in that adding the cladding material can itself create stress and defects in the turbine blades. Furthermore this method can create performance mismatches between those turbine blades that have been repaired and those that have not been repaired.

Thus, there is a need for the development of new repair methods that improve the reliability and performance of the repair at cheaper costs in the refurbishment process.

BRIEF SUMMARY OF THE INVENTION

The present invention provides an improved method for repairing high pressure turbine (HPT) components such as blades and vanes in a turbine engine. The method utilizes a cold gas-dynamic spray technique to repair turbine engine components. In the cold gas-dynamic spray process particles at a temperature well below their melting temperature are accelerated and directed to a target surface on the turbine engine component. When the particles strike the target surface, the kinetic energy of the particles is converted into plastic deformation of the particle, causing the particle to form a strong bond with the target surface. Thus, the cold gas-dynamic spray process can apply a powder material to the worn surface of the turbine engine components to restore both geometry and dimension and to repair other defects in the components.

The cold gas-dynamic spray process can deposit high-strength superalloy materials that are difficult to apply using more conventional techniques. For example, the cold gas-dynamic spray process can be used to apply repair alloys such as high strength nickel base superalloys that in general are not easily welded. When these types of alloys are welded, cracks and other defects in both weld and base material frequently result, requiring costly reworking and resulting in high rejection rates. In contrast, the cold gas-dynamic spray process can apply these repair alloys without many of the problems associated with welding them.

To further effectuate repairs made by cold gas-dynamic spray process a variety of post-spray processing is performed. The post-spray processing is used to consolidate the cold gas-dynamic spray applied material and restore metallurgical integrity to the repaired turbine component. For example, the post processing can improve the microstructure and phase distribution of material in the repaired area of the turbine component. Otherwise, in some cases a lack of metallurgical bonding may occur between the splats on the repaired turbine component. This could otherwise result in poor thermo-mechanical properties, something that can be problematic in high temperature applications such as turbine components. To overcome these problems, additional processing is needed to achieve the desired mechanical properties. This processing can include vacuum sintering, hot isostatic pressing and beat treatment. An appropriate combination of post processing procedures can improve the likelihood of repair success and thus reliability of the repaired turbine component.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides an improved method for repairing high pressure turbine (HPT) components such as turbine blades. The method utilizes a cold gas-dynamic spray technique to apply high-strength superalloy materials to the worn surface of turbine engine components. These materials can be used to repair degraded components such as blades and vanes caused by erosion, oxidation, corrosion, thermal fatigue cracks and foreign object damage to name several examples.

Figure 1:
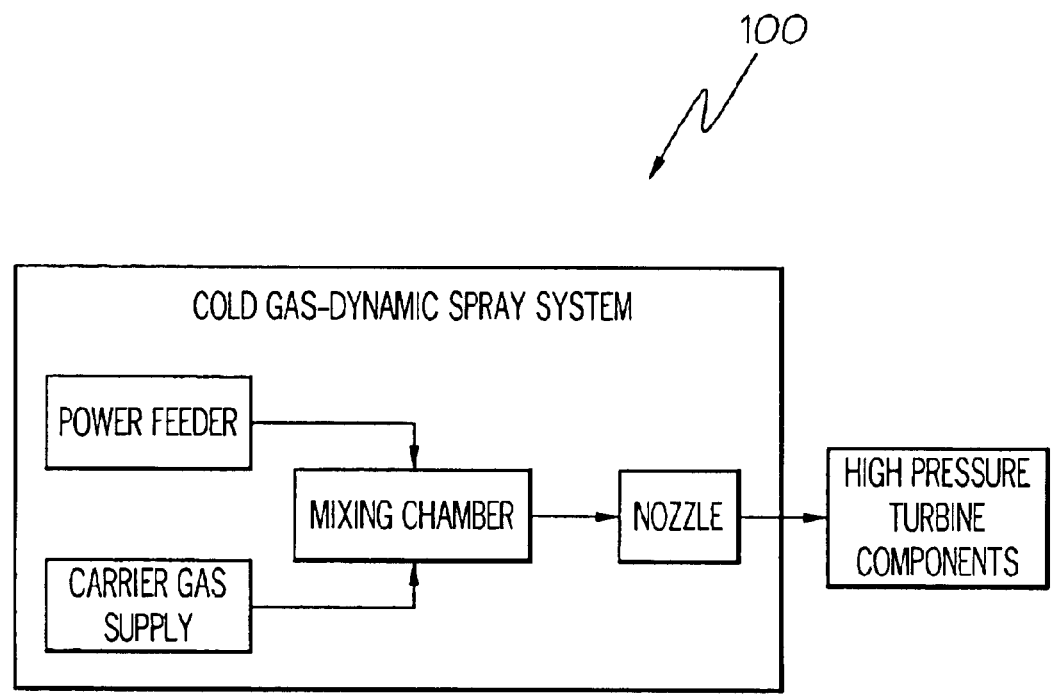
FIG. 1 is a schematic view of an exemplary cold gas-dynamic spray apparatus in accordance with an exemplary embodiment.

Turning now to FIG. 1, an exemplary cold gas-dynamic spray system 100 is illustrated schematically. The cold gas-dynamic spray system 100 is a simplified example of a type of system that can be used to repair turbine components. Those skilled in the art will recognize that most typical implementations of cold gas-dynamic spray systems would include additional features and components. The cold-gas-dynamic spray system 100 includes a powder feeder for providing repair powder materials, a carrier gas supply (typically including a heater), a mixing chamber and a convergent-divergent nozzle. In general, the system 100 mixes the repair particles with a suitable pressurized gas in the mixing chamber. The particles are accelerated through the specially designed nozzle and directed toward a target surface on the turbine component. When the particles strike the target surface, the kinetic energy of the particles is converted into plastic deformation of the particle, causing the particle to form a strong bond with the target surface. Thus, the cold gas-dynamic spray system 100 can repair degraded areas in the turbine components.

The cold gas dynamic spray process is referred to as a "cold gas" process because the particles are mixed and applied at a temperature that is well below the melting point of the particles. Thus, it is the kinetic energy of the particles on impact with the target surface that causes the particles to deform and bond with the target surface, not the preexisting temperature of the particles themselves. Therefore, the bonding is affected through solid state and there is no transition of molten droplet due to absence of requisite thermal energy.

The cold gas-dynamic spray system 100 can apply high-strength superalloy materials that are difficult to apply using more conventional techniques. For example, the cold gas-dynamic spray system 100 can be used to apply alloys that in general are not easily welded. When these types of alloys are welded, cracks and other defects frequently result, requiring costly reworking and resulting in high rejection rates. In contrast, the cold gas-dynamic spray system 100 can be used to deposit multiple layers of these alloys without the problems associated with welding them. Thus, the system 100 can apply the repair materials to turbine components that are made from material that has poor weldability A wide variety of different types of materials can be used to repair turbine blades, including superalloys, wear resistant alloys, and environmentally resistant alloys. Examples of the type of superalloys that can be applied to turbine blades using a cold gas-dynamic spray process include HS188, Hastelloy X, INCO 713, INCO 738, INCO 939, MarM247, Rene 80, C 101 as well as specially formulated and tailored alloys. An example of a wear-resistant alloy that can be used is Stellite 694. An example of an environmentally resistant alloy that can be used is MCrAlY and reactive elements modified MCrAlY. All these alloys have desirable characteristics, but many are difficult to apply using conventional welding techniques such as TIG and/or laser welding. These materials can be applied with a cold gas-dynamic spray process to repair a variety of turbine blades. In many cases, the same material used in the blade would be used for the repair. In other cases, a material different than the underlying material would be used for the repair.

The cold gas-dynamic spray process can be used to repair a variety of different turbine engine components. For example, the turbine blades in the high pressure stages of a turbine engine are particularly susceptible to wear and other degradation. This wear can occur in many different areas of the turbine blade. For example, the tip, leading and trailing edge, airfoil, platform and knife seal edge on high pressure turbine blades call be subjected to significant wear in many applications.

Figure 2:
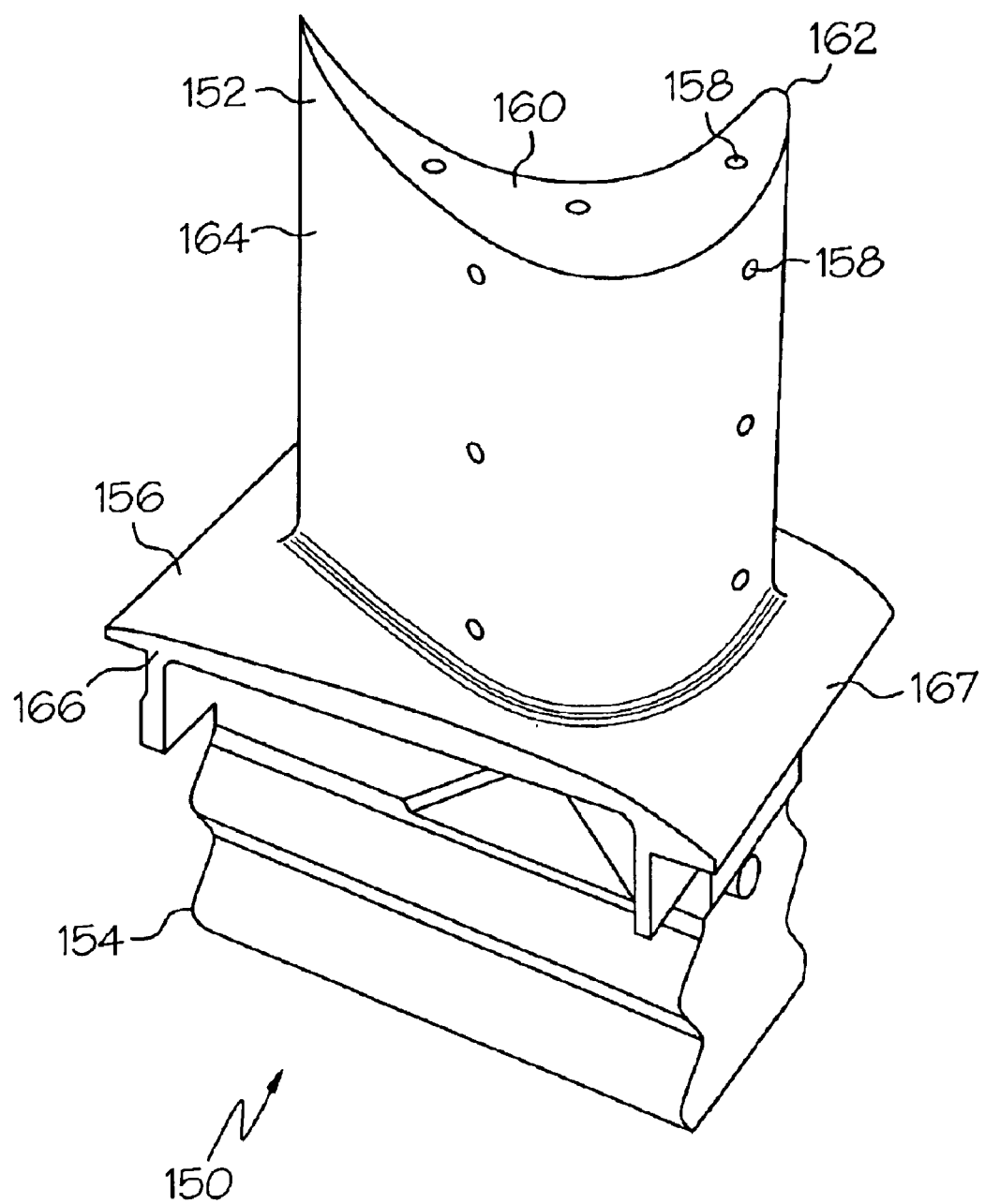
FIG. 2 is a perspective view of an exemplary turbine blade in accordance with an exemplary embodiment.

Turning now to FIG. 2, an exemplary turbine blade 150 is illustrated. Turbine blade 150 is exemplary of the type of turbine blades that are used in the turbine engines and is thus exemplary of the type of blade which can be repaired using the methods and processes of the present invention. Turbine blades commonly have a different shape, dimension and size depending on gas turbine engine models and applications. In a typical turbine engine, multiple turbine blades 150 are positioned in adjacent circumferential position along a hub or rotor disk. The turbine blades are typically made from advanced super alloys such as IN713, IN738, IN792, MarM247, GTD111, Rene142, Rene N5, SC180 and CMSX4 to name several non-exclusive examples. These superalloys provide the high elevated-temperature strength needed for the blades, but also typically suffer from poor weldability due to the high volume fraction of gamma prime.

The turbine blade 150 includes an airfoil 152, a cup like structure that is sometimes referred to as a bucket. The airfoil 152 includes a concave face and a convex face. In operation, hot gases impinge on the airfoil 152 concave face and thereby provide the driving force for the turbine engine. The airfoil 152 includes a leading edge 162 and a trailing edge 164 that firstly and lastly encounter an air stream passing around airfoil 152. The blade 150 also includes a tip 160. In some applications the tip may include raised features commonly known as squealers.

As stated above, the turbine blade 150 is mounted on a turbine hub or rotor disk (not shown) by a dovetail 154 which extends downwardly from the airfoil 152 and engages a slot on the turbine hub. A platform 156 extends longitudinally outwardly from the area where the airfoil 152 is joined to the dovetail 154. A number of cooling channels desirably extend through the interior of the airfoil 152, ending in openings 158 in the surface of the airfoil 152.

The cold gas-dynamic spray process can be used to repair a variety of different portions of the exemplary turbine blade 150. The processes used to repair the various parts of the turbine blade would depend on the type of location of the degradation. For example, degradation on the tip 160 of the airfoil 152 can be repaired using the cold gas-dynamic spray process. As discussed above, the tip 160 of a turbine blade 150 is particularly subject to degradation, typically due to oxidation, erosion, thermal fatigue and foreign particle impacts. In this application, the cold gas dynamic spray process is used to apply materials that return the tip 160 of the turbine blade 150 back to the required dimensions. This can be done by filling any material loss, cracks or other defects with cold gas-dynamic sprayed repair material followed by machining to make the tip 160 have the correct dimensions. When repaired in such a manner and in combination with post-spray processing the performance of the tip 160 and the turbine blade 150 can be fully restored.

As another example, degradation on the leading edge 162 and trailing edge 164 of the airfoil 152 can be repaired using the cold gas-dynamic spray process. The leading edge 162 and trailing edge 164 are both subject to degradation, again typically due to oxidation, erosion and foreign particle impacts. In this application, the cold gas dynamic spray process is used to apply materials that return the edges of the turbine blade back to the required dimensions. Again, this can be done by filling the worn surface and other defects with cold gas-dynamic sprayed repair material followed by dimensional restoration and post-spray processing.

As another example, degradation on the platform 156 can be repaired using the cold gas-dynamic spray process. In some applications, wear on the platform 156 occurs at the contact surfaces 166 between adjacent turbine blades. At those locations, the friction between platforms can cause erosion and other wear. In addition, thermal fatigue in the platform 156 can cause cracks on the top surface 167 of the platform. In both these applications, the cold gas-dynamic spray process can be used to fill the worn surface, cracks and other defects to on the platform and restore the desired dimensions.

Again, these are just examples of how a typical turbine blade can be repaired using the cold gas-dynamic spray process. In addition to squealer tip type turbine blades in high pressure stages, other blades like low pressure turbine (LPT) blades can also be repaired using a cold gas dynamic spray process. As one other specific example, the cold gas-dynamic spray process can be used to repair z-notches of turbine blades.

Figure 3:
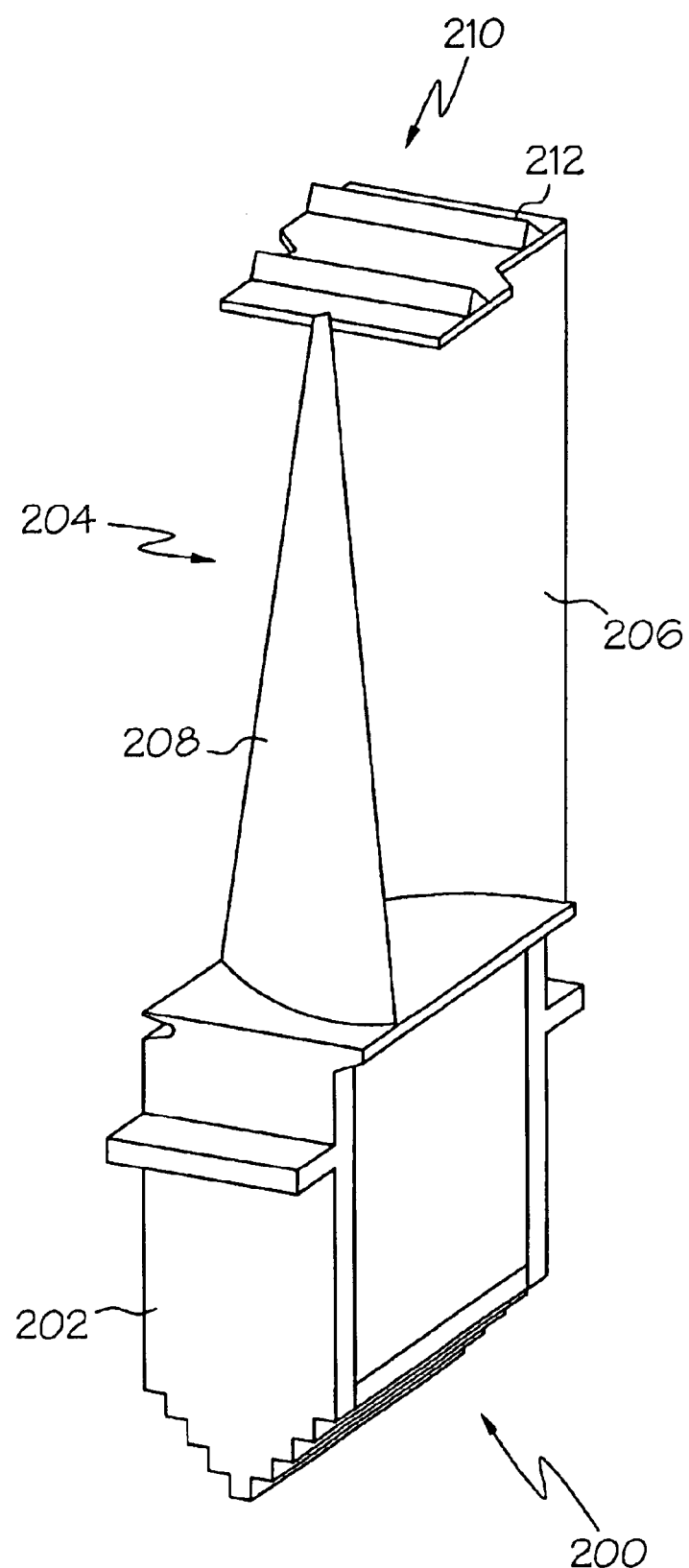
FIG. 3 is a perspective view of an second exemplary turbine blade in accordance with an exemplary embodiment.

Turning now to FIG. 3, a second exemplary turbine blade 200 is illustrated. Turbine blade 200 is another example of the type of blade that can be repaired using the cold gas-dynamic spray process. The turbine blade 200 includes a serrated base assembly 202 where the blade is affixed to a hub (not shown). The turbine blade 200 also includes an airfoil 204, a cup like pocket structure that is sometimes referred to as a bucket. The airfoil 204 includes a concave face 206 and a convex face 208.

Figure 4:
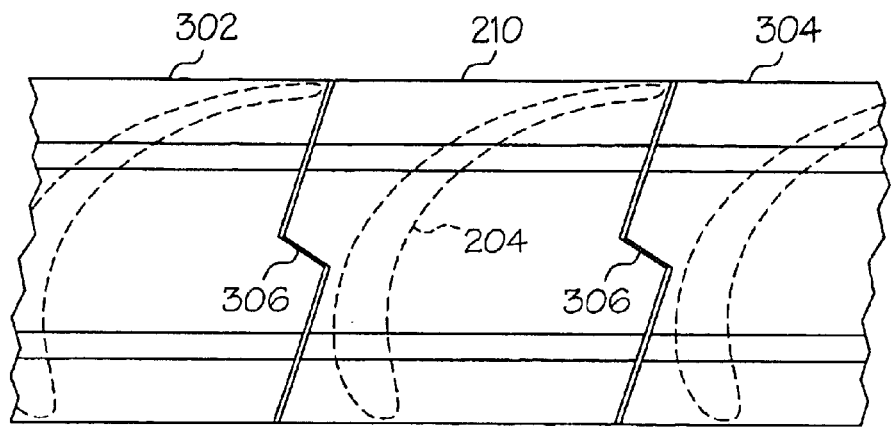
FIG. 4 is a top view of the second exemplary turbine blade shroud structure having a z-notch edge shape in accordance with an exemplary embodiment.

The turbine blade 200 also includes a shroud structure 210 at the upper or outer radial end of the turbine blade 200. Turning now to FIG. 4, a top view of typical shroud structure 210 is illustrated along with portions of two adjacent shrouds 302 and 304. Shown in dashed outline is the airfoil 204. As illustrated in FIG. 4, the neighboring shrouds interlock using a z-notch configuration. Specifically, each shroud includes a z-notch edge shape 306 where neighboring blades interlock. The z-notch interlock provides the turbine blades with an additional degree of stiffness to offset the twisting forces that the blades experience during operation. The z-notches can also counterbalance harmful vibrations in the turbine blades and ensure that the blades are properly aligned.

Because the interlocking faces of the z-notches are points of contact between turbine blades these faces may experience wear and erosion during operation of the turbine engine. The embodiments of the present invention can be used to repair degradation to the z-notch surfaces with a cold gas-dynamic spray application repair materials. Of course, this is just one other example of where wear on the turbine blade can occur, and the cold gas-dynamic spray process can be used to repair other portions of the turbine blades.

As another example, degradation on the knife seal 212 of the airfoil 204 can be repaired using the cold gas-dynamic spray process. The knife seal 212 of the turbine blade 200 is likewise subject to degradation, again typically due to oxidation, erosion and foreign particle impacts. In this application, the cold gas dynamic spray process is used to apply materials that return the knife seal 212 of the turbine blade back to the required dimensions. Again, this can be done by filling the worn surface and other defects with cold gas-dynamic sprayed repair material followed by machining to the edges have correct dimensions.

Turbine blades are just one example of the type of turbine components that can be repaired using a cold gas-dynamic spray process. As other example, many gas turbine engines include a shroud structure that surrounds a row of turbine blades at the outer radial end of the blades. The shroud, like the blade tips, can be subject erosion and repaired using the cold gas-dynamic spray process. Other turbine components that can be repaired in such a manner include nozzle guide vanes, vane support structures, rotor nozzles and other HPT components.

As discussed above, a suitable cold gas-dynamic spray system typically includes a powder feed for transporting repair alloy, a carrier gas supply, a mixing chamber and a nozzle. The system mixes the repair alloy particles with a suitable carrier gas in the mixing chamber. The particles are accelerated through the nozzle and directed toward a target surface on the turbine blade, such as the worn areas of the turbine blade. When the particles strike the target surface, the kinetic energy of the particles is converted into plastic deformation of the particle, causing the particle to form a strong bond with the target surface. Thus, the cold gas-dynamic spray system can repair degraded areas in the turbine blades.

A variety of different systems and implementations can be used to perform the cold gas-dynamic spraying process. Cold gas-dynamic spray systems were originally developed at the Institute for Theoretical and Applied Mechanics of the Siberian Division of the Russian Academy of Science in Novosibrisk. The cold gas-dynamic spray process developed there was described in U.S. Pat. No. 5,302,414, entitled "Gas-Dynamic Spraying Method for Applying a Coating". This patent describes an exemplary system designed to accelerate materials having a particle size of between 5 to about 50 microns, to be mixed with a process gas to ensure a density of mass flow rate of the particles 0.05 and 17 g/s-cm$^2$ in the system. Supersonic velocity is imparted to the gas flow, with the jet formed at high density and low temperature using a predetermined profile. The resulting gas and powder mixture is introduced into the supersonic jet to impart sufficient acceleration to ensure a velocity of the particles ranging from 300 to 1200 m/s. In this method, the particles are applied and deposited in the solid state, i.e., at a temperature which is considerably lower than the melting point of the powder material. The resulting coating is formed by the impact and kinetic energy of the particles which gets converted to high-speed plastic deformation, causing the particles to bond to the surface. The system typically uses gas pressures of between 5 and 20 atm, and at a temperature of up to 750 degrees F. As non limiting examples, the gases can comprise air, nitrogen, helium and mixtures thereof. Again, this system is but one example of the type of system that can be adapted to cold spray powder materials to the target surface.

Figure 5:
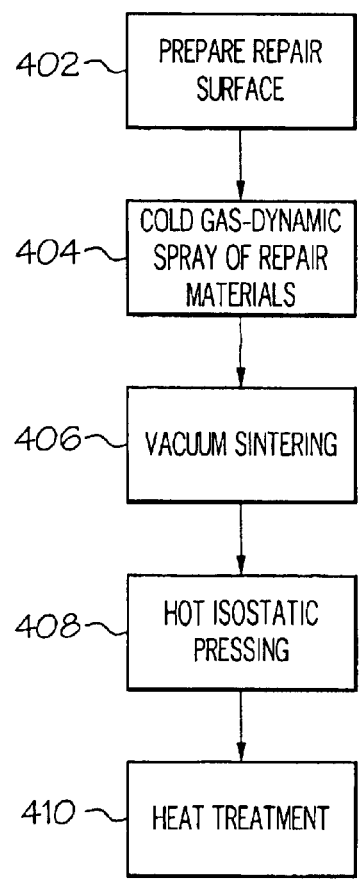
FIG. 5 is a flow diagram of a repair method in accordance with an exemplary embodiment.

Turning now to FIG. 5, an exemplary method 400 for repairing turbine components is illustrated. This method uses a cold gas-dynamic spray process but also includes additional processes to improve the resulting repairs. As described above, cold gas-dynamic spray involves "solid state" processes to effect bonding and coating build-up, and does not rely on thermal energy to improve bonding. Unfortunately, this can result in the developed microstructures of the material not exhibiting the desired structures and phase distributions to produce the desired properties. Also, the repair material applied by cold gas-dynamic spray are more likely to exhibit lack of metallurgical bonding between the splats and as a consequence many thermo-mechanical properties such as the elastic/plastic properties, mechanical properties, thermal conductivity and thermal expansion properties are not likely to be at desired levels. Hence, for the repairs to components in high temperature applications, such as turbine engine components, additional processing is generally necessary to restore these desired properties. In method 400, this additional processing includes vacuum sintering, hot isostatic pressing and heat treatment. These processing steps are designed to consolidate and homogenize the cold gas-dynamic spray applied material and to restore metallurgical integrity to the repaired turbine component.

The first step 402 is to prepare the repair surface on the turbine component. For example, on a turbine blade this can involve pre-machining, degreasing and grit blasting of the area that needs to be repaired on the turbine blade. This preparation of the repair surface can remove any oxidation and dirty materials and prepare the surface for the cold gas dynamic spray process.

The next step 404 is to perform a cold gas-dynamic spray of repair materials on the turbine component. As described above, in cold gas-dynamic spraying, particles at a temperature below their melting temperature are accelerated and directed to a target surface on the turbine component. When the particles strike the target surface, the kinetic energy of the particles is converted into plastic deformation of the particle, causing the particle to form a strong bond with the target surface.

As described above, this step can include the application of repair material to a variety of different components in the turbine engine. For example, it can be used to apply material to worn surfaces on turbine blades and vanes in general, and to blade tips, knife seals, leading/trailing edges, platform and z-notch edge shape of the shroud particular. In all these cases, the material can be added to the worn surfaces to return the component to its desired dimensions.

With the repair materials deposited to the worn surfaces of the turbine component, the next step 406 is to perform a vacuum sintering. In vacuum sintering, the repaired turbine component is diffusion heat treated at high temperature in a vacuum for a period of time. The vacuum sintering can render the metallurgical bonding across splat interfaces through elemental diffusing processes. The vacuum sintering can also remove inter-particle micro-porosity, homogenize and consolidate the buildup via an atom diffusion mechanism. The thermal process parameters for the vacuum sintering would depend on the superalloy used in the turbine component. As one example, the repaired components are heat treated at 2050 degrees F. to 2300 degrees F. for 2 to 4 hours, and more preferably at 2050 degrees F. to 2200 degrees F.

The next step 408 is to perform a hot isostatic pressing on the repaired turbine component. The hot isostatic pressing (commonly referred to as HIP) is a high temperature, high-pressure process. This process can be employed to fully consolidate the cold-sprayed buildup and eliminate defects like shrinkage and porosity (a common defect related to the cold-gas dynamic-spray process). Additionally, this process can strengthen the bonding between the buildup of repair materials and the underlying component, homogenize chemistries in the applied materials, and rejuvenate microstructures in the base superalloy. Overall mechanical properties such as elevated temperature tensile and stress rupture strengths of repaired gas turbine components can thus be dramatically improved with the hot isostatic pressing.

As one example of hot isostatic pressing parameters, the pressing can be performed for 2 to 4 hours at temperatures of between 2100 and 2300 degrees F. and at pressures of 10 to 30 ksi. Of course, this is just one example of the type of hot isostatic pressing process that can be used to remove defects after the application of repair materials.

In some embodiments, it may be desirable to perform a rapid cool following the HIP process to reduce the high-temperature solution heat treatment aftermath that could otherwise exist. For example, in the case of a nickel based superalloys, rapid cool from the HIP temperature can comprise cooling at a rate of about 45 to 60 degrees F. per minute, from the HIP temperature to below 1200 degrees F., which is normally below the age temperature for such alloys. One advantage of the rapid cool capability is that the component alloy and the repair material are retained in "solution treated condition", reducing the need for another solution treatment operation. In other words, the HIP followed by rapid cool can provide a combination of densification, homogenization and solution treat operation. Using this technique can thus eliminate the need for other heat treatment operations.

The next step 410 is to perform a heat treatment on the repaired component. The heat treatment can provide a full restoration of the elevated-temperature properties of turbine components. As one example, a three-stage heat treatment can be applied. Specifically, a repaired turbine blade can be solution heat heated for 2 to 4 hours at temperature of between 2000 to 2200 degrees F., an intermediate treatment of 2 to 4 hours at 1900 to 2000 degrees F. followed by the age treatment of 16–24 hours at between 1300 to 1800 degrees F. As another preferred embodiment, the repaired turbine blade can be heated for 2 hours at temperature of 2050 degrees F., followed by 2–4 hours at 1950 degrees for diffusion and overlay coating heat treatment, and 16–24 hours at 1550 degrees F. for the age heat treatment. It should be noted that in some applications it may be desirable to delete the high temperature solution treatment if such operation can be accomplished in steps 404 and/or 406.

The present invention thus provides an improved method for repairing turbine engine components. The method utilizes a cold gas-dynamic spray technique to repair degradation in turbine blades and other turbine engine components. These methods can be used to repair a variety of defects thus can improve the overall durability, reliability and performance of the turbine engine themselves.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A method for repairing a high pressure turbine component, the method comprising the steps of:

cold gas-dynamic spraying powder material to repair degradation in at least a portion of the high pressure turbine component;

vacuum sintering the high pressure turbine component after the cold gas-dynamic spraying step;

performing a hot isostatic pressing on the high pressure turbine component after the vacuum sintering step; and heat treating the high pressure turbine component after performing the hot isostatic pressing step.

2. The method of claim 1 wherein the high pressure turbine component comprises a turbine blade.

3. The method of claim 2 wherein the turbine blade comprises a tip, and wherein the cold gas-dynamic spraying is performed on the tip.

4. The method of claim 2 wherein the turbine blade comprises a leading edge, and wherein the cold gas-dynamic spraying is performed on the leading edge.

5. The method of claim 2 wherein the turbine blade comprises a platform, and wherein the cold gas-dynamic spraying is performed on the platform.

6. The method of claim 2 wherein the turbine blade comprises a z-notch shroud, and wherein the particles are sprayed on the z-notch shroud.

7. The method of claim 1 wherein the step of performing a vacuum sintering comprises sintering in a vacuum for between 2 and 4 hours at temperatures of between 2050 degrees F. and 2300 degrees F.

8. The method of claim 1 wherein the step of performing a hot isostatic pressing on the turbine component comprises pressing for between 2 and 4 hours at temperatures of between 2100 and 2300 degrees F. and at pressures of between 10 and 30 ksi.

9. The method of claim 1 further comprising the step of performing a rapid cooling of between 45 and 60 degrees F. per minute to a desired temperature level after the hot isostatic pressing.

10. The method of claim 1 wherein the step heat treating the high pressure turbine component comprises a heat treatment of between 2 to 4 hours at temperatures of between 2000 and 2200 degrees F. followed by a second beat treatment of between 16 to 24 hours at temperatures of between 1300 and 1800 degrees F.

11. A method for repairing degradation on a turbine blade, the method comprising the steps of:

providing repair powder material;

mixing the repair powder material into a flow of gas, the gas at a temperature below a melt temperature of the repair powder material;

accelerating the repair powder material mixed into the flow of gas;

directing the accelerated repair powder material to a target surface on the turbine blade, wherein the repair powder material deforms on the target surface to repair degradation on the turbine blade;

vacuum sintering the turbine blade for between 2 and 4 hours at temperatures of between 2050 degrees F. and 2300 degrees F.;

performing a hot isostatic pressing on the turbine blade for between 2 and 4 hours at temperatures of between 2100 and 2300 degrees F. and at pressures of between 10 and 30 ksi; and heat treating the turbine blade between 2 to 4 hours at temperatures of between 2000 and 2200 degrees F. followed by a second heat treatment of between 16 to 24 hours at temperatures of between 1300 and 1800 degrees F.

* * * * *

UNITED STATES PATENT AND TRADEMARK OFFICE
CERTIFICATE OF CORRECTION

PATENT NO.     : 6,905,728 B1
DATED          : June 14, 2005
INVENTOR(S)    : Yiping Hu et al.

It is certified that error appears in the above-identified patent and that said Letters Patent is hereby corrected as shown below:

Column 10,
Line 6, delete "beat" and add -- heat --.

Signed and Sealed this

Eleventh Day of October, 2005

JON W. DUDAS
*Director of the United States Patent and Trademark Office*